US012722797B2

(12) United States Patent
Scherrer

(10) Patent No.: US 12,722,797 B2
(45) Date of Patent: Sep. 1, 2026

(54) VEHICLE ARRESTING SYSTEM

(71) Applicant: Runway Safe IPR AB, Gothenburg (SE)

(72) Inventor: Ralf Scherrer, Urnasch (CH)

(73) Assignee: RUNWAY SAFE IPR AB, Gothenburg (SE)

( * ) Notice: Subject to any disclaimer, the term of this patent is extended or adjusted under 35 U.S.C. 154(b) by 642 days.

(21) Appl. No.: 18/251,287

(22) PCT Filed: Oct. 29, 2021

(86) PCT No.: PCT/EP2021/080161
§ 371 (c)(1),
(2) Date: May 1, 2023

(87) PCT Pub. No.: WO2022/090485
PCT Pub. Date: May 5, 2022

(65) Prior Publication Data

US 2023/0415917 A1 Dec. 28, 2023

(30) Foreign Application Priority Data

Oct. 29, 2020 (EP) .................................... 20204720

(51) Int. Cl.

| | |
|---|---|
| ***E01C 9/00*** | (2006.01) |
| ***B64F 1/02*** | (2006.01) |
| ***E01F 13/12*** | (2006.01) |

(52) U.S. Cl.
CPC ............. *B64F 1/025* (2013.01); *E01C 9/007* (2013.01); *E01F 13/12* (2013.01)

(58) Field of Classification Search
CPC ........... B64F 1/025; E01C 9/007; E01F 13/12
See application file for complete search history.

(56) References Cited

U.S. PATENT DOCUMENTS

| | | | | |
|---|---|---|---|---|
| 5,193,764 A * | 3/1993 | Larratt | B64F 1/025 | 244/110 A |
| 5,902,068 A * | 5/1999 | Angley | E01C 9/007 | 404/34 |
| 6,685,387 B2 * | 2/2004 | Allen | B64F 1/025 | 244/110 E |
| 6,726,400 B1 * | 4/2004 | Angley | E01C 9/007 | 404/71 |

(Continued)

OTHER PUBLICATIONS

International Search Report and Written Opinion of the International Searching Authority for International Application No. PCT/EP2021/080161 dated Feb. 11, 2022.

*Primary Examiner* — Abigail A Risic
(74) *Attorney, Agent, or Firm* — Harness, Dickey & Pierce, P.L.C.

(57) ABSTRACT

A vehicle arresting system includes a base layer, a carrier positioned and fixed by at least one fixation means on said base layer, a levelling layer, and a top layer. The base layer includes at least one compressible material. The base layer includes a bottom sublayer, a middle sublayer, and optionally an upper sublayer. The bottom sublayer includes a compressible material. The at least one fixation means fixedly attaches the carrier to the base layer. The levelling layer is positioned directly on and/or embedding said carrier, such that the levelling layer is in physical contact with said carrier.

21 Claims, 4 Drawing Sheets

(56) References Cited

U.S. PATENT DOCUMENTS

| | | | | |
|---|---|---|---|---|
| 8,021,075 | B2 * | 9/2011 | Valentini | B64F 1/025 404/34 |
| 8,740,141 | B2 * | 6/2014 | Prevost | B64F 1/025 244/110 E |
| 10,711,407 | B2 * | 7/2020 | Webber | E01C 9/007 |
| 11,970,288 | B2 * | 4/2024 | Ungerleider | C04B 28/34 |
| 2008/0014019 | A1 | 1/2008 | Allen et al. | |
| 2008/0247819 | A1 | 10/2008 | Valentini et al. | |
| 2009/0166469 | A1 * | 7/2009 | Prevost | B64F 1/025 244/110 R |
| 2010/0254762 | A1 * | 10/2010 | Valentini | B64F 1/025 404/34 |
| 2012/0057931 | A1 * | 3/2012 | Narmo | B64F 1/025 244/114 R |
| 2013/0020437 | A1 | 1/2013 | Valentini et al. | |
| 2015/0251773 | A1 * | 9/2015 | Doherty | C04B 38/10 521/146 |
| 2016/0340838 | A1 * | 11/2016 | Doherty | B64F 1/025 |
| 2017/0356137 | A1 | 12/2017 | Webber et al. | |
| 2018/0251233 | A1 * | 9/2018 | Barsotti | E01C 19/48 |
| 2020/0023996 | A1 | 1/2020 | Barsotti et al. | |

* cited by examiner 1
16
15
14
5
3
2
14
15'
13
15
6
4

VEHICLE ARRESTING SYSTEM

CROSS-REFERENCE TO RELATED APPLICATIONS

This application is a national phase under 35 U.S.C. § 371 of PCT International Application No. PCT/EP2021/080161 which has an International filing date of Oct. 29, 2021, which claims priority to European Patent Application No. 20204720.5, filed Oct. 29, 2020, the entire contents of each of which are hereby incorporated by reference.

TECHNICAL FIELD

The present invention relates to the field of vehicle arresting systems and methods for producing such systems.

BACKGROUND ART

An aircraft overshooting the runway due to high speed or unfavourable weather conditions may have serious consequences for people and aircrafts. Engineered material arrestor systems (EMAS) comprising high energy absorbing materials have been developed for arresting an aircraft when overshooting the runway. Those materials crush under the weight of a moving aircraft. By transferring kinetic energy from the aircraft to the material the aircraft is slowed down. Current systems typically use cellular cement materials or lightweight aggregate foams made from recycled glass.

However, the durability of existing EMAS is limited. Variable and harsh weather conditions (e.g. sun exposure in summer and freezing temperatures in winter, rain, hail, storms etc.) negatively affect present aircraft arresting systems. In addition, jet blast from aircrafts taking off and light traffic are known to damage currently applied EMAS. In particular, the surface of the current systems does not show sufficient resistance in regard to such environmental and aircraft-caused conditions.

It is an object of the present invention to provide a vehicle arresting system which overcomes the drawbacks of known EMAS and which can be produced quickly in an environmental friendly manner and with limited costs.

SUMMARY OF THE INVENTION

The present invention relates to a vehicle arresting system comprising:

a) a base layer comprising at least one compressible material;

b) a carrier positioned and fixed by at least one fixation means on said base layer;

c) a levelling layer positioned on and/or embedding said carrier; and d) a top layer.

The base layer comprising at least one compressible material is used to slow down a moving vehicle. The compressible material is a high energy absorbing material characterized by a low bulk density, which crushes under the weight of a moving vehicle.

The top layer provides a cover for the base layer in order to protect the base layer from external or environmental influences such as harsh weather conditions (e.g. water, ice, snow, UV light, wind) or jet blasts.

It turned surprisingly out that the top layer can be effectively linked to said base layer by using a carrier and a fixation means according to the present invention. The linkage between the base layer and the top layer is further improved by the levelling layer positioned above the carrier and below the top layer.

The fixation means allows to firmly attach the carrier to the base layer. This is particularly advantageous, because it provides a structure which is highly resistant to jet blast uplift forces. Furthermore, without the carrier, the top layer cannot be durably adhered to the base layer due to the relatively weak binding properties of the base layer, which is a result of a low bulk density and low tensile strength of the base layer.

The levelling layer is positioned on the carrier and/or embeds the carrier. The levelling layer further improves the binding of the top layer to the base layer and provides a smooth and flat surface.

According to the present invention, the base layer and the top layer may comprise several sublayers. Preferably, the top layer has weather protective and fire retardant properties.

Another aspect of the present invention relates to a method for producing a vehicle arresting system comprising a base layer, a carrier, at least one fixation means for fixing the carrier to the base layer, a levelling layer and a top layer.

DESCRIPTION OF EMBODIMENTS

The vehicle arresting system 1 of the present invention is also referred to as "engineered materials arresting system" (EMAS) and can be used for decelerating or stopping a moving vehicle such as an aircraft, a cars and a truck. The system may be installed on roads, streets and airports.

Preferably, the system is used for arresting an aircraft overshooting the runway. Therefore the inventive system is preferably installed as an extension of airport runways.

According to another aspect, the system may be used to prevent vehicles such as cars or trucks from entering a protected area, for example a pedestrian area. Preferably, the vehicle arresting system tolerates the weight of pedestrians and light vehicles such as bicycles, but crushes under the weight of heavier vehicles such as cars and trucks.

Figures 1, 2:
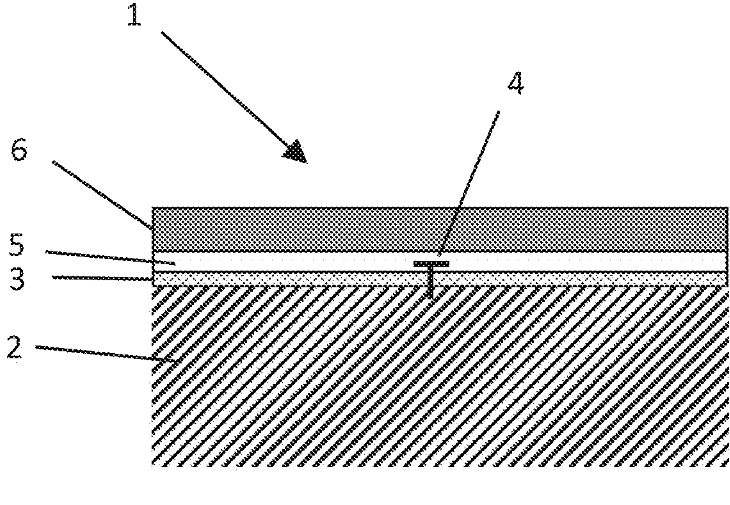
FIG. 1 shows the cross section of a vehicle arresting system 1 according to the present invention. The system comprises a base layer 2. A carrier 3 is positioned on the base layer 2 and fixed to the base layer by a fixation means 4. A levelling layer 5 covers and/or embeds the carrier. The levelling layer 5 is covered by a top layer 6.
FIG. 2 shows a cross section of a vehicle arresting system 1 as depicted in FIG. 1 comprising an additional means for releasing vapour pressure 7 from the base layer 2.

FIG. 1 shows the cross section of a vehicle arresting system 1 according to the present invention, comprising a base layer 2, a carrier 3 fixed to the base layer by a fixation means 4, a levelling layer 5 and a top layer 6.

According to one embodiment, the vehicle arresting system 1 comprises at least one means for releasing vapor pressure 7 from the base layer. An embodiment of the present invention comprising a means for releasing vapor pressure 7 is depicted in FIG. 2.

The means for releasing vapor pressure 7 may have the form of a tube reaching from the base layer to the surface. The means for releasing vapor pressure 7 may stand out from the surface of the top layer to allow humidity to escape from the base layer. This is particularly useful if the top layer is waterproof and air tight. For example, a means for releasing vapor pressure 7 may be installed every 10 to 1000 $m^2$ on the vehicle arresting system 1, preferably every 250 to 500 $m^2$.

According to the present invention, the base layer 2 comprises at least one compressible material. The compressible material may be selected from one or more of the group consisting of concrete, cellular concrete, foamed concrete, foam glass, ceramic foam, polymeric foam, bound expanded clay aggregate, silica foam, bound foam glass, metal foam, autoclaved aerated concrete and aggregates thereof.

The concrete used according to the present invention may comprise cement, which is a common binder in concrete.

According to one embodiment, the base layer 2 consists of foamed concrete or cellular concrete. Preferably, the foamed concrete is produced from local concrete near the place of installation of the vehicle arresting system and is pumped directly to the place of use. Producing foamed concrete on site and pumping it directly to the place of installation allows using local resources and reduces the need for heavy machines for installing the EMAS, thereby reducing installation time and costs.

The foamed concrete is preferably applied at a thickness of 30 mm to 1250 mm, preferably 40 mm to 1000 mm, more preferably 50 mm to 500 mm.

Alternatively, the foamed concrete may be supplied in the form of blocks produced in a factory.

According to another embodiment, the compressible material is in the form of an aggregate. Preferably, the compressible material consists of or comprises foam glass aggregate, such as a loose or bagged foam glass aggregate forming a bed.

The foam glass used in the system of the present invention may be fabricated from inorganic non-metallic glass material. The foam glass typically comprises cellular structures with a diameter ranging from 0.1 to 5 mm, preferably from 0.2 to 4 mm, more preferably from 0.5 to 3 mm, more preferably from 1 to 2 mm. The foam glass of the present invention may comprise open and/or closed cells. Methods for producing such foam glass are well known in the art.

In one embodiment, the base layer 2 comprises one or more sublayers. Preferably, at least one sublayer comprises a compressible material as defined above.

Figure 3:
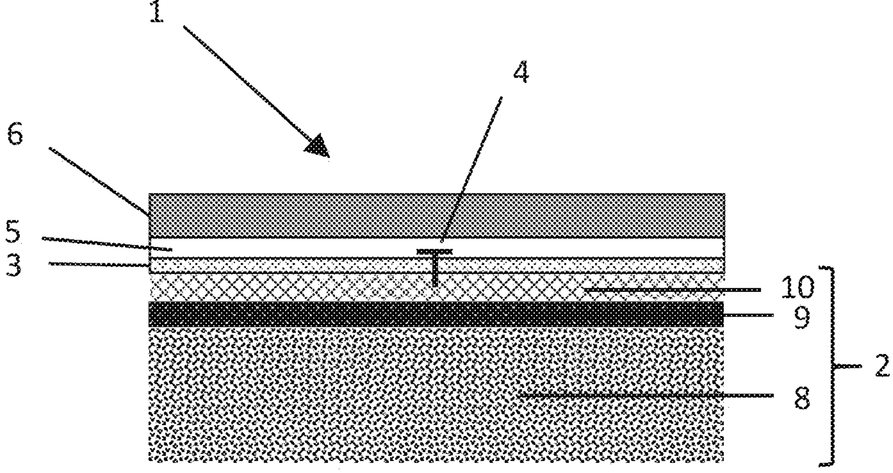
FIG. 3 shows a cross section of a vehicle arresting system 1 as depicted in FIG. 1, wherein the base layer 2 consists of 3 sublayers: a bottom sublayer 8, a middle sublayer 9 and a cover sublayer 10.
Figure 4:
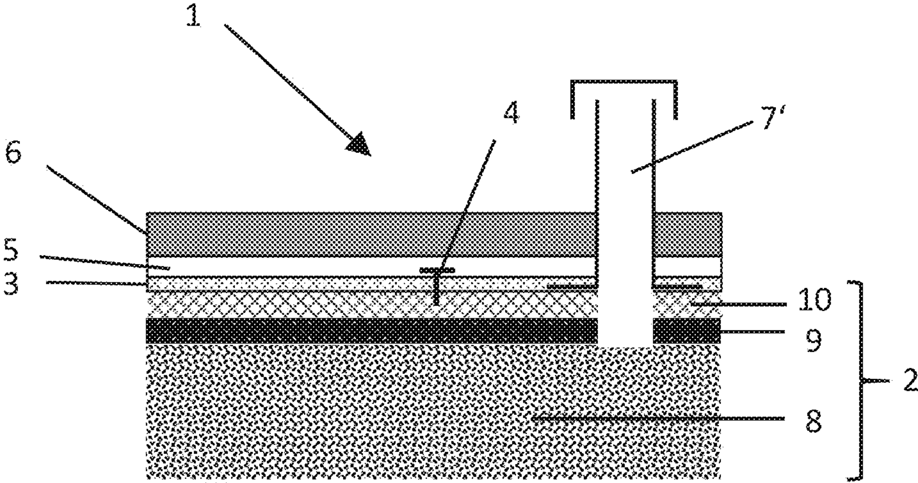
FIG. 4 shows a cross section of a vehicle arresting system 1 as depicted in FIG. 3, comprising an additional means for releasing vapour pressure 7' from the bottom sublayer 8.

According to a specific embodiment, the base layer comprises a bottom sublayer 8, a middle sublayer 9 and optionally an upper sublayer 10. FIG. 3 shows an embodiment of the present invention, wherein the base layer 2 consists of a bottom sublayer 8, a middle sublayer 9 and an upper sublayer 10. Preferably, the bottom sublayer 8 comprises a compressible material such as cellular concrete or foam glass aggregate. A means for releasing vapor pressure 7' may be installed on the bottom sublayer 8 to release humidity from the bottom sublayer 8. FIG. 4 shows an additional means for releasing vapor pressure 7'.

In a specific embodiment, the bottom sublayer 8 comprises a foam glass aggregate, the middle sublayer 9 comprises a material selected from the group consisting of a controlled low-strength material, foamed concrete and mixtures thereof, and the optional upper sublayer 10 comprises polyacrylate or polymethacrylate.

The term "controlled low-strength material" (CLSM) refers, for instance, to a low-strength concrete material. Such materials, which may be a particular form of cementitious material, may have a compressive strength between about 1.38 and about 4.14 MPa, with a preferred density of about 1762 to 2082 $kg/m^3$. In one example, CLSM may be made by mixing sand and cement with water optionally by adding further fly ash, admixtures, and/or fibres.

Figure 5:
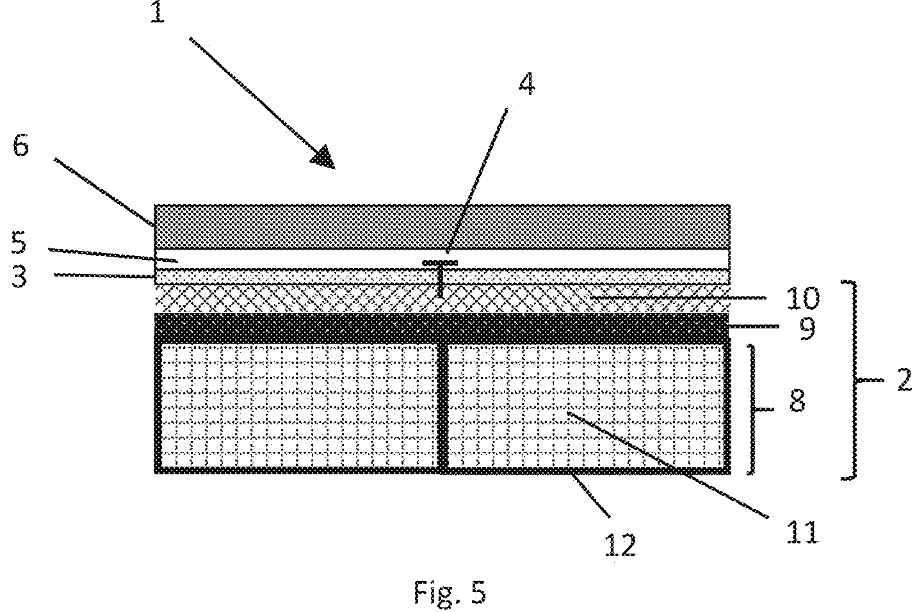
FIG. 5 shows a cross section of a vehicle arresting system 1 as depicted in FIG. 3, wherein the bottom sublayer 8 comprises a block of compressible material 11 covered by a mesh 12.

In another embodiment, the bottom sublayer 8 comprises at least one block of compressible material 11, the middle sublayer 9 comprises a foam sheet and the optional upper sublayer 10 comprises a polymer, wherein the block of compressible material is at least partly covered by a mesh 12. FIG. 5 shows an embodiment of the present invention, wherein the base layer 8 comprises a block of compressible material 11 covered by a mesh 12. Preferably, the compressible material is cellular concrete. Preferably, the foam sheet consists of polyethylene foam. The mesh 12 is preferably a nylon mesh. The upper layer may consist of a thermoplastic polymer.

In another embodiment, the bottom sublayer 8 comprises at least one block of compressible material 11 and an upper sublayer 10 comprising a polymer.

According to one embodiment of the present invention, the carrier 3 is selected from the group consisting of a grid, a net, a mesh, a foil, a fleece, a mat and mixtures thereof. The carrier 3 according to the present invention is strong enough to firmly attach the top layer 6 to the base layer 2 and weak enough to break under the weight of a moving vehicle.

Preferably, the carrier 3 comprises a material selected from the group consisting of a geotextile material, a geofleece, a rubber mat, a bentonite mat, a synthetic fabric, a glass fibre fabric, a textile cloth, a plastic film, a fabric of an animal product, preferably sheep's wool, a fabric of a natural product, preferably jute or coconut, a paper, a cardboard and any a combination thereof.

According to a particularly preferred embodiment, the carrier 3 is a grid, a net or a mesh made of a geotextile material.

In one embodiment, the carrier 3 is a net or a mesh with a mesh size ranging from 0 to 350 mm, preferably 10 to 50 mm.

The carrier 3 preferably covers the upper surface of the base layer 2. The carrier 3 may additionally also cover the side surfaces of the base layer 2.

The carrier 3 is fixed to the base layer 2 by at least one fixation means 4. Any fixation means 4 capable of firmly attaching the carrier to the base layer 2 is suitable. The carrier 3 may be fixed to the base layer 2 by a fixation means 4 on the upper surface or on the side surfaces of the base layer 2. Preferably, the fixation means 4 is used to fix the carrier 3 to the base layer 2 at regular intervals. The skilled person is able to determine the necessary amount of fixation means 4 per $m^2$ of the vehicle arresting system 1. For example, if the fixation means 4 is an anchor, 0.1 to 8 anchors, preferably 1 to 5 anchors, may be used per $m^2$ of the vehicle arresting system 1.

According to one embodiment of the present invention, the fixation means 4 is selected from the group consisting of an impact anchor, an adhesive anchor, an expansion anchor, a rope anchor, a bearing plate, an anchor plate, a screw and an adhesive. The fixation means may be fabricated from a metal, an alloy, a polymer or a composite material.

Preferably, the fixation means is an anchor or a screw.

According to one embodiment of the present invention, the levelling layer 5 comprises or consists of a material selected from the group consisting of polyurethane, polyurea, bitumen, mortar, hydraulic binder, polyurethane foam, epoxy resin and any combination thereof. The levelling layer may also comprise a hydraulic binder in the form of an aggregate. The levelling layer may further comprise fibres for reinforcement, for example steel fibres and/or plastic fibres.

The term "hydraulic binder" refers to a material which hydrates in the presence of water and thereby forms a paste which hardens over time. The hydraulic binder may for example be selected from the group consisting of cement, limestone and gypsum.

Preferably, the levelling layer 5 consists of bitumen and/or a hydraulic binder.

In another preferred embodiment the levelling layer 5 is obtainable from a first composition comprising at least one isocyanate and at least one polyamine and/or at least one polyol. Thus, the levelling layer 5 preferably comprises polyurea and/or polyurethane. The first composition used to produce the levelling layer 5 may further comprise a floating agent, such as pyrogenic silica.

The terms "at least one isocyanate", "at least one polyol", and "at least one polyamine" mean that one or more different types of isocyanates, polyols and polyamines may be used.

Preferably, the first composition comprising at least one isocyanate and at least one polyamine and/or at least one polyol is applied on the carrier 3 by using a spray, a brush, a roller or any other appropriate application technique.

The at least one isocyanate according to the present invention is preferably selected from the group consisting of aliphatic isocyanates such as methylene diisocyanate, a bifunctional monomer of tetra-alkyl xylene diisocyanate, cyclohexan diisocyanate, 1,12-dodecane diisocyanate, 1,4-tetramethylene diisocyanate, isophorone diisocyanate, and dicyclohexylmethane diisocyanate; aromatic isocyanates such as m-phenylene diisocyanate, p-phenylene diisocyanate, polymethylene polyphenylisocyanate, 2,4-toluene diisocyanate, 2,6-toluene diisocyanate, dianisidine diisocyanate, bitolylene diisocyanate, naphthalene-1,4-diisocyanate, and diphenylene-4,4'-diisocyanate; and aliphatic/aromatic diisocyanates such as xylylene-1,3-diisocyanate, bis(4-isocyanatophenyl)methane, bis(3-methyl-4-isocyanatophenyl) methane, and 4,4'-diphenylpropane diisocyanate; and mixtures thereof. More preferably, the isocyanate is an aromatic isocyanate.

Preferably, the polyamine of the first composition is selected from the group consisting of polyoxypropylenediamine, diethyltoluenediamine, methylenedianaline, polyoxypropylene triamine, substituted methylenedianaline and secondary methylenedianaline.

Preferably, the at least one polyol of the first composition is selected from the group consisting of polyester polyols, preferably polyetheylene terephthalate (PET) based polyols, more preferably recycled PET based polyols. The polyol may also be selected from the group consisting of mannich based polyols, aliphatic amine based polyols and polyether-based polyols.

Preferably, the ratio of the least one isocyanate and the at least one polyamine and/or at least one polyol in the first composition used to produce the levelling layer 5 is from 3:1 to 7:1, preferably from 4:1 to 6:1, more preferably from 4.5:1 to 5.5:1.

In another embodiment, the levelling layer 5 comprises a mixture of at least one polyol and at least one polyamine. The ratio of the at least one polyol and the at least one polyamine may range from 2:1 to 6:1, preferably from 3:1 to 5:1, more preferably from 3.5:1 to 4.5:1. A mixture of polyols and polyamines in the levelling layer 5 allows obtaining good rheological properties and a smooth and flat surface.

The levelling layer 5 may have a thickness of 0.1 to 10 mm, preferably from 0.5 to 5 mm, more preferably from 1 to 4 mm, more preferably from 1 to 3 mm.

According to one embodiment of the present invention, the top layer 6 preferably comprises at least one material selected from the group consisting of polyurea, polyurethane, bitumen, mortar, hydraulic binder and mixtures thereof.

Preferably, the top layer 6 comprises bitumen, mortar and/or a hydraulic binder.

According to a preferred embodiment, the top layer 6 comprises a fire retardant. The fire retardant renders the top layer 6 heat resistant. The fire retardant is preferably selected from the group consisting of tris(chloropropyl) phosphate, aluminium trihydrate, antimony oxide and sodium borate.

According to another preferred embodiment, the top layer 6 comprises one or more sublayers.

Preferably, the top layer 6 comprises a polyurethane sublayer 13 and a polyurea sublayer 14. The polyurethane sublayer 13 and polyurea sublayer 14 allow a high durability of the top layer 6 and provide protection against harsh weather conditions and jet blasts.

Figure 6:
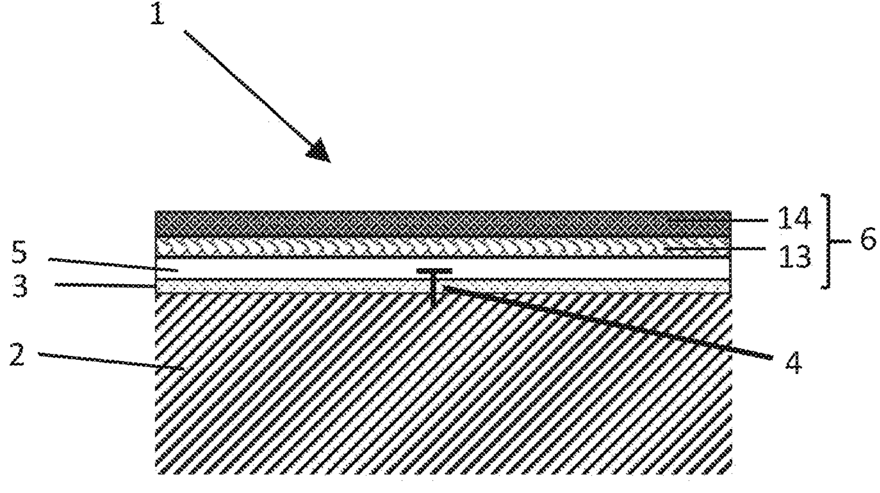
FIG. 6 shows a cross section of a vehicle arresting system 1 as depicted in FIG. 1, wherein the top layer 6 comprises a polyurethane layer 13 and a polyurea layer 14, which polyurea layer 14 is positioned above the polyurethane layer 13.

FIG. 6 shows an embodiment of the present invention comprising a base layer 2, a carrier 3, a fixation means 4, a levelling layer 5 and a top layer 6 consisting of a polyurethane sublayer 13 and a polyurea sublayer 14. In the embodiment depicted in FIG. 6, the base layer 2 may comprise a compressible material as described above. Further, the base layer 2 may have any of the structures as described above. In particular, the base layer 2 may consist of one or more sublayers, such as a bottom sublayer 8, a middle sublayer 9 and an upper sublayer 10.

Preferably, the polyurethane sublayer 13 is positioned above said levelling layer 5 and below said polyurea sublayer 14.

According to a preferred embodiment, the polyurethane sublayer 13 is obtainable from at least one isocyanate and a second composition comprising at least polyol and at least one catalyst. The at least one isocyanate may be an isocyanate as defined above.

The polyol of the second composition is preferably a polyester polyol, more preferably a polyetheylene terephthalate (PET) based polyol, even more preferably a recycled PET based polyol. The polyol may also be selected from the group consisting of mannich based polyols, aliphatic amine based polyols and polyether-based polyols.

The catalyst is preferably selected from the group consisting of 1,3,5-tris(dimethylaminopropyl)-1,3,5-hexahydrotriazine, N,N,N'-trimethyl-N'-hydroxyethyl-bisaminoethylether and potassium octoate.

The at least one isocyanate and the second composition comprising at least one polyol and at least one catalyst are preferably combined to form the polyurethane sublayer 13 in a ratio of 0.1:1 to 5:1, preferably 0.5:1 to 4:1, more preferably 0.8:1 to 2.5:1, more preferably 0.9:1 to 1.1:1.

Preferably, said second composition comprises 60 to 95 wt %, preferably 70 to 90 wt %, of the at least one polyol, and 1 to 5 wt %, preferably 2 to 4 wt %, of the at least one catalyst. The second composition may further comprise water, preferably 1 to 5 wt % water, even more preferably 1.2 to 3 wt % of water. Water is added to generate carbon dioxide gas by a reaction of the isocyanate with water. Due to the formation of carbon dioxide, the polyurethane is formed as a foam.

Preferably, the second composition comprising a polyol and at least one catalyst further comprises a fire retardant as defined above and optionally a surfactant. Preferably, the surfactant is a silicone surfactant.

According to a preferred embodiment, the polyurethane layer 13 has a thickness of 1 to 50 mm, preferably 1 to 40 mm, more preferably 1 to 30 mm, more preferably 1 to 20 mm, more preferably 1 to 15 mm, more preferably 5 to 10 mm.

A thickness of the polyurethane sublayer 14 within this range is favorable for the crushing properties of the inventive vehicle arresting system.

According to a preferred embodiment, the polyurea sublayer 14 is obtainable from at least one isocyanate and a third composition comprising at least one polyamine.

The at least one isocyanate may be an isocyanate as defined above. The polyamine of the third composition may be selected from the group consisting of polyoxypropylenediamine, diethyltoluenediamine, methylenedianaline, polyoxypropylene triamine, substituted methylenedianaline and secondary methylenedianaline.

The at least one isocyanate and the third composition comprising at least one polyamine are preferably combined to form the polyurea sublayer 14 in a ratio of 0.5:1.5 to 1.5:0.5, preferably 1:1.

Preferably, the third composition comprising at least one polyamine comprises 60 to 100 wt %, preferably 65 to 95 wt %, more preferably 65 to 90 wt %, of the at least one polyamine.

Preferably, said third composition further comprises 2 to 20 wt %, preferably 5 to 15 wt %, more preferably 5 to 10 wt %, of a fire retardant as defined above.

Preferably, the polyurea sublayer 14 has a thickness of 0.1 to 10 mm, preferably 0.2 to 5 mm, more preferably 0.5 to 3 mm, more preferably 0.5 to 2 mm, more preferably 0.5 to 1.2 mm, more preferably 0.5 to 1 mm.

Figures 7, 8:
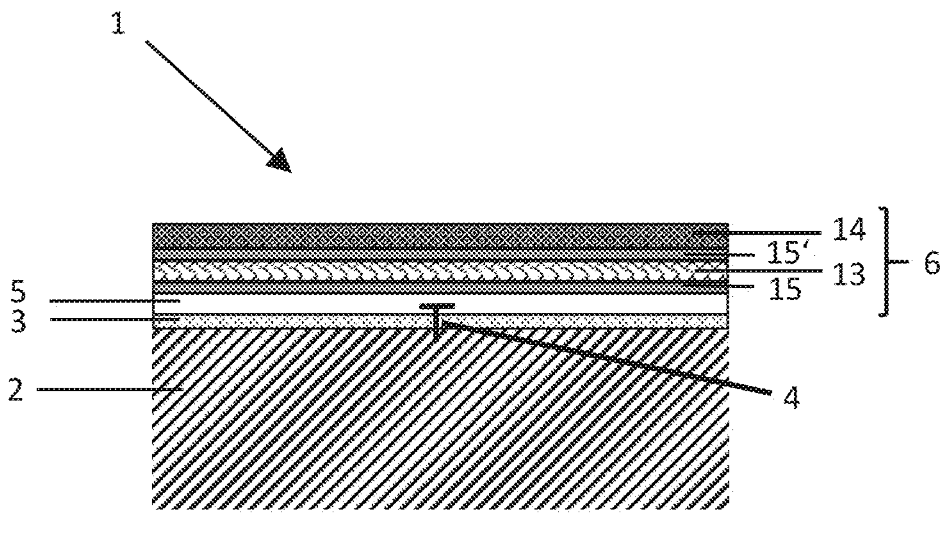
FIG. 7 shows a cross section of a vehicle arresting system 1 as depicted in FIG. 6, wherein a primer sublayer 15 is positioned between the levelling layer 5 and the polyurethane sublayer 13 and a primer sublayer 15' is positioned between the polyurethane sublayer 13 and the polyurea sublayer 14.
FIG. 8 shows a cross section of a vehicle arresting system 1 as depicted in FIG. 7, wherein an anti-slip layer 16 is positioned above the top layer 6.

According to one embodiment, the top layer 6 further comprises a primer sublayer 15 positioned between said levelling layer 5 and said polyurethane sublayer 13. Additionally the top layer 6 may comprise a primer sublayer 15' positioned between said polyurethane sublayer 13 and said polyurea sublayer 14. The primer sublayers 15 and 15' are used to seal the surface and to improve the binding of the levelling layer 5 to the polyurethane sublayer 13 and the binding of the polyurethane sublayer 13 to the polyurea sublayer 14. FIG. 7 shows the embodiment of FIG. 6 further comprising a primer sublayer 15 and 15'.

According to a preferred embodiment, the primer sublayer 15 and 15' comprises polyurethane, preferably obtainable by combining at least one polyisocyanate and at least one polyol. Preferably, the primer sublayer 15 and 5' is substantially water-free.

The at least one polyol used in the primer sublayer 15 and 15' may be a hydroxyl group comprising triglyceride or fatty acid from a natural source, preferably selected from the group consisting of castor oil, ricolinoeic acid, cashew nut oil and soy based polyol.

Preferably, the at least one isocyanate and the at least one polyol are combined to produce the primer sublayer 15 and 15' in a ratio of 0.5:1.5 to 1.5:0.5, preferably 1:1.

According to one embodiment, the vehicle arresting system 1 further comprises an anti-slip layer 16 positioned above the top layer 6. Preferably, the anti-slip layer 16 comprises polyurea and optionally an air release agent.

In a preferred embodiment, the anti-slip layer 16 is obtainable from at least one isocyanate and a fourth composition comprising at least one polyamine.

The at least one isocyanate may be an isocyanate as defined above. The at least one polyamine of the fourth composition may be selected from the group consisting of a polyaspartic ester, preferably based on methylene dicyclohexyl amines.

The air release agent is preferably a silane based air release agent.

Preferably, the at least one isocyanate and the fourth composition comprising at least one polyamine are combined to produce the anti-slip layer 16 in a ratio of 0.5:2 to 2:0.5, preferably 1:1.5.

Preferably, the fourth composition comprises 80 wt % to 98 wt %, preferably 90 wt % to 98 wt %, more preferably 95 wt % to 98 wt %, of the at least one polyamine.

The fourth composition may additionally comprise 2 wt % to 5 wt %, preferably 2 wt % to 4 wt %, of the at least one air release agent.

The anti-slip layer 16 facilitates the movement of people or light vehicles on the vehicle arresting system 1. Furthermore, the anti-slip layer 16 may provide improved color stability of the system according to the present invention.

Preferably the anti-slip layer 16 has a thickness of 0.1 to 2 mm, preferably 0.25 to 1 mm.

FIG. 8 shows the embodiment of FIG. 7, further comprising an anti-slip layer 16 on top of the top layer 6. The anti-slip layer 16 may be applied on any top layer material described herein.

The present invention further relates to a method for producing a vehicle arresting system 1. The method comprises the steps of:

a. providing a base layer 2 comprising a compressible material;
b. positioning and fixing a carrier 3 on said base layer (2) by at least one fixation means 4;
c. forming a levelling layer 5 on said carrier of step b); and
d. forming a top layer 6.

According to one embodiment, after step a), a means for releasing vapor pressure 7 is positioned on said base layer 2.

According to further embodiment, the levelling layer 5 is formed by applying a material selected from the group consisting of bitumen, mortar, hydraulic binder, polyurethane foam, an epoxy resin and any combination thereof.

According to a preferred embodiment, the levelling layer 5 is formed by applying a first composition comprising at least one isocyanate and at least one polyamine and/or at least one polyol as defined above.

According to a preferred embodiment, the top layer 6 is formed by applying at least one material selected from the group consisting of polyurethane, polyurea, bitumen, mortar, hydraulic binder and mixtures thereof.

Preferably, said top layer 6 comprises a polyurethane sublayer 13 and a polyurea sublayer 14 as defined above. The polyurethane sublayer 13 may be formed from at least one isocyanate and a second composition comprising a polyester polyol and at least one catalyst as defined above.

The polyurea sublayer 14 may be formed by applying at least one isocyanate and a third composition comprising at least one polyamine as defined above.

According to a preferred embodiment of the inventive method, a primer sublayer 15 is applied on said levelling layer 5 and/or a primer sublayer 15' is applied on said polyurethane sublayer 13. The primer sublayer 15 and 15' may have a composition as defined above.

According to another preferred embodiment, an anti-slip layer 16 is formed on said top layer 6. The anti-slip layer 16 is preferably formed by applying at least one isocyanate and a fourth composition comprising at least one polyamine and optionally at least one air release agent.

Preferred embodiments of the present invention are listed below:

1. A vehicle arresting system 1 comprising:
   a. a base layer 2 comprising at least one compressible material;
   b. a carrier 3 positioned and fixed by at least one fixation means 4 on said base layer 2;
   c. a levelling layer 5 positioned on and/or embedding said carrier 3; and
   d. a top layer 6.
2. The vehicle arresting system 1 of embodiment 1, further comprising at least one means for releasing vapor pressure 7 from said base layer 2.
3. The vehicle arresting system 1 of embodiment 1 or 2, wherein said at least one compressible material is selected from one or more of the group consisting of concrete, cellular concrete, foamed concrete, foam glass, ceramic foam, polymeric foam, bound expanded clay aggregate, silica foam, bound foam glass, metal foam, autoclaved aerated concrete and aggregates thereof.
4. The vehicle arresting system 1 of any one of embodiments 1 to 3, wherein said compressible material is in the form of an aggregate.
5. The vehicle arresting system 1 of any one of embodiments 1 to 4, wherein said base layer 2 comprises one or more sublayers comprising said at least one compressible material.
6. The vehicle arresting system 1 of any one of embodiments 1 to 5, wherein said base layer 2 comprises a bottom sublayer 8, a middle sublayer 9, and optionally an upper sublayer 10.
7. The vehicle arresting system 1 of embodiment 6, wherein a means for releasing vapor pressure 7' is positioned on the bottom sublayer 8.
8. The vehicle arresting system 1 of embodiment 6 or 7, wherein said bottom sublayer 8 comprises a foam glass aggregate, said middle sublayer 9 comprises a material selected from the group consisting of a controlled low-strength material and foamed concrete, and said optional upper sublayer 10 comprises polyacrylate or polymethacrylate.
9. The vehicle arresting system 1) of embodiment 6 or 7, wherein said bottom sublayer 8 comprises at least one block of compressible material 11, preferably cellular concrete, said middle sublayer 9 comprises a foam sheet, and said optional upper sublayer 19 comprises a polymer, and wherein said at least one block of compressible material 11 is at least partly covered by a mesh 12.
10. The vehicle arresting system 1 of any one of embodiments 1 to 9, wherein said carrier 3 is selected from the group consisting of a grid, a net, a mesh, a foil, a fleece and mixtures thereof.
11. The vehicle arresting system 1 of any one of embodiments 1 to 10, wherein said carrier 3 comprises a material selected from the group consisting of a geotextile material, a geo-fleece, a rubber mat, a bentonite mat, a synthetic fabric, a glass fibre fabric, a textile cloth, a plastic film, a fabric of an animal product, preferably sheep's wool, a fabric of natural product, preferably jute or coconut, a paper, and a cardboard and any combination thereof.
12. The vehicle arresting system 1 of any one of embodiments 1 to 11, wherein said carrier 3 is a net or a mesh with a mesh size ranging from 0 to 350 mm, preferably 10 to 50 mm.
13. The vehicle arresting system 1 of any one of embodiments 1 to 12, wherein said fixation means 4 is selected from the group consisting of an impact anchor, an adhesive anchor, an expansion anchor, a rope anchor, a bearing plate, an anchor plate, a screw and an adhesive.
14. The vehicle arresting system of any one of embodiments 1 to 13, wherein said levelling layer 5 comprises or consists of a material selected from the group consisting of polyurethane, polyurea, bitumen, mortar, hydraulic binder, polyurethane foam, epoxy resin and any combination thereof.
15. The vehicle arresting system 1 of any one of embodiments 1 to 14, wherein said levelling layer 5 is obtainable from a first composition comprising at least one isocyanate and at least one polyamine and/or at least one polyol.
16. The vehicle arresting system 1 of embodiment 15, wherein said first composition comprising at least one isocyanate and at least one polyamine and/or at least one polyol further comprises a floating agent, preferably pyrogenic silica.
17. The vehicle arresting system 1 of any one of embodiments 1 to 16, wherein said top layer 6 comprises at least one material selected from the group consisting of polyurea, polyurethane, bitumen, mortar, hydraulic binder and mixtures thereof.
18. The vehicle arresting system 1 of any one of embodiments 1 to 17, wherein said top layer 6 comprises one or more sublayers.
19. The vehicle arresting system 1 of any one of embodiments 1 to 18, wherein said top layer 6 comprises a polyurethane sublayer 13 and a polyurea sublayer 14.
20. The vehicle arresting system 1 of embodiment 19, wherein said polyurethane sublayer 13 is positioned above said levelling layer 5 and below said polyurea sublayer 14.
21. The vehicle arresting system 1 of embodiment 20, wherein the top layer 6 further comprises a primer sublayer 15 positioned between said levelling layer 5 and said polyurethane sublayer 13 and/or a primer sublayer 15' positioned between said polyurethane sublayer 13 and said polyurea sublayer 14.
22. The vehicle arresting system 1 of any one of embodiments 19 to 21, wherein said polyurethane sublayer 13 is obtainable from at least one isocyanate and a second composition comprising at least one polyol and at least one catalyst.

23. The vehicle arresting system 1 of embodiment 22, wherein said at least one catalyst is selected from the group consisting of 1,3,5-tris(dimethylaminopropyl)-1,3,5-hexahydrotriazine, N,N,N'-trimethyl-N'-hydroxyethyl-bisaminoethylether and potassium octoate.
24. The vehicle arresting system 1 of embodiment 22 or 23, wherein said second composition comprising at least one polyol and at least one catalyst further comprises a fire retardant and optionally a surfactant, preferably a silicone surfactant.
25. The vehicle arresting system 1 of any one of embodiments 19 to 24, wherein said polyurethane sublayer 13 has a thickness of 1 to 50 mm, preferably 1 to 40 mm, more preferably 1 to 30 mm, more preferably 1 to 20 mm, more preferably 1 to 15 mm, more preferably 5 to 10 mm.
26. The vehicle arresting system 1 of any one of embodiments 19 to 25, wherein said polyurea sublayer 14 is obtainable from at least one isocyanate and a third composition comprising at least one polyamine.
27. The vehicle arresting system 1 of any one of embodiments 18 to 25, wherein said polyurea sublayer 14 has a thickness of 0.1 to 10 mm, preferably 0.2 to 5 mm, more preferably 0.5 to 3 mm, more preferably 0.5 to 2 mm, more preferably 0.5 to 1.2 mm, more preferably 0.5 to 1 mm.
28. The vehicle arresting system 1 of any of embodiments 21 to 27, wherein said primer sublayer 15, 15' comprises polyurethane, preferably obtainable by combining at least one polyisocyanate and at least one polyol, and wherein said primer sublayer is substantially water-free.
29. The vehicle arresting system 1 of any one of embodiments 1 to 28, wherein said top layer 6 comprises a fire retardant.
30. The vehicle arresting system 1 of any one of embodiments 1 to 29, further comprising an anti-slip layer 16 positioned above said top layer 6.
31. The vehicle arresting system 1 of embodiment 30, wherein said anti-slip layer 16 comprises polyurea and optionally an air release agent, preferably a silane based release agent.
32. The vehicle arresting system 1 of any one of embodiments 29 to 31, wherein said anti-slip layer 16 has a thickness of 0.1 to 2 mm, preferably 0.25 to 1 mm.
33. A method for producing a vehicle arresting system 1 according to any one of embodiments 1 to 32, comprising the steps of:
a. providing a base layer 2 comprising a compressible material;
b. positioning and fixing a carrier 3 on said base layer (2) by at least one fixation means 4;
c. forming a levelling layer 5 on said carrier of step b); and
d. forming a top layer 6.
34. The method of embodiment 33, wherein after step a), a means for releasing vapor pressure 7 is positioned on said base layer 2.
35. The method of embodiment 33 or 34, wherein said leveling layer 5 is formed by applying a material selected from the group consisting of bitumen, mortar, hydraulic binder, polyurethane foam, an epoxy resin and any combination thereof.
36. The method of any one of embodiments 33 to 35, wherein said levelling layer 5 is formed by applying a first composition comprising at least one isocyanate and at least one polyamine and/or at least one polyol.
37. The method of any one of embodiments 33 to 36, wherein said top layer 6 is formed by applying at least one material selected from the group consisting of polyurethane, polyurea, bitumen, mortar, hydraulic binder and mixtures thereof.
38. The method of any one of embodiments 33 to 37, wherein said top layer 6 comprises a polyurethane sublayer 13 and a polyurea sublayer 14.
39. The method of embodiment 38, wherein said polyurethane sublayer 13 is formed by applying at least one isocyanate and a second composition comprising at least one polyol and at least one catalyst.
40. The method of embodiment 38 or 39, wherein said polyurea sublayer 14 is formed by applying at least one isocyanate and a third composition comprising at least one polyamine.
41. The method of any one of embodiments 38 to 40, wherein a primer sublayer 15 is applied on said levelling layer 5 and/or a primer sublayer 15' is applied on said polyurethane sublayer 13.
42. The method of any one of embodiments 33 to 41, wherein an anti-slip layer (16) is formed on said top layer (6) by applying at least one isocyanate and a fourth composition comprising at least one polyamine and optionally at least one air release agent.

The invention claimed is:

1. A vehicle arresting system comprising:
a) a base layer comprising at least one compressible material, wherein said base layer includes a bottom sublayer, a middle sublayer, and optionally an upper sublayer, wherein the bottom sublayer includes a compressible material;
b) a carrier positioned and fixed by at least one fixation means on said base layer, wherein the at least one fixation means fixedly attaches the carrier to the base layer;
c) a levelling layer positioned directly on and/or embedding said carrier, such that the levelling layer is in physical contact with said carrier; and
d) a top layer.

2. The vehicle arresting system of claim 1, further comprising at least one means for releasing vapor pressure from said base layer.

3. The vehicle arresting system of claim 1, wherein said at least one compressible material is in a form of an aggregate.

4. The vehicle arresting system of claim 1, wherein said bottom sublayer comprises a foam glass aggregate, said middle sublayer comprises a material selected from the group consisting of a controlled low-strength material and foamed concrete, and said upper sublayer that is optionally included in the base layer comprises polyacrylate or polymethacrylate.

5. The vehicle arresting system of claim 1, wherein said carrier is a net or a mesh with a mesh size ranging from 0 to 350 mm.

6. The vehicle arresting system of claim 1, wherein said at least one fixation means is selected from the group consisting of an impact anchor, an adhesive anchor, an expansion anchor, a rope anchor, a bearing plate, an anchor plate, a screw and an adhesive.

7. The vehicle arresting system of claim 1, wherein said levelling layer comprises or consists of a material selected from the group consisting of polyurethane, polyurea, bitumen, mortar, hydraulic binder, polyurethane foam, epoxy resin and any combination thereof.

8. The vehicle arresting system of claim 1, wherein said top layer comprises one or more sublayers.

9. The vehicle arresting system of claim 1, wherein said top layer comprises a polyurethane sublayer and a polyurea sublayer.

10. The vehicle arresting system of claim 9, wherein said polyurethane sublayer is positioned above said levelling layer and below said polyurea sublayer.

11. The vehicle arresting system of claim 10, wherein the top layer further comprises a primer sublayer positioned between said levelling layer and said polyurethane sublayer and/or a primer sublayer positioned between said polyurethane sublayer and said polyurea sublayer.

12. The vehicle arresting system of claim 9, wherein said polyurethane sublayer has a thickness of 1 to 50 mm.

13. The vehicle arresting system of claim 1, further comprising an anti-slip layer positioned above said top layer.

14. A method for producing a vehicle arresting system according to claim 1, the method comprising:

a) providing a base layer comprising a compressible material;

b) positioning and fixing a carrier on said base layer by at least one fixation means;

c) forming a levelling layer on said carrier of step b); and d) forming a top layer.

15. The method of claim 14, wherein after step a), a means for releasing vapor pressure is positioned on said base layer.

16. The method of claim 14, wherein said levelling layer is formed by applying a first composition comprising at least one isocyanate and at least one polyamine and/or at least one polyol.

17. The method of claim 14, wherein said top layer comprises a polyurethane sublayer and a polyurea sublayer.

18. The method of claim 17, wherein said polyurethane sublayer is formed by applying at least one isocyanate and a second composition comprising at least one polyol and at least one catalyst.

19. The method of claim 17, wherein said polyurea sublayer is formed by applying at least one isocyanate and a third composition comprising at least one polyamine.

20. The method of claim 17, wherein a primer sublayer is applied on said levelling layer and/or a primer sublayer is applied on said polyurethane sublayer.

21. The method of claim 14, wherein an anti-slip layer is formed on said top layer by applying at least one isocyanate and a fourth composition comprising at least one polyamine and optionally at least one air release agent.

* * * * *